— 3,223,529 —
COMPOSITION FOR IMPROVING FOAM OF MALT BEVERAGES
Irwin M. Stone, Staten Island, N.Y., assignor to Baxter Laboratories, Inc.
No Drawing. Filed Mar. 7, 1961, Ser. No. 93,851
1 Claim. (Cl. 99—48)

This invention relates to the stabilization of the foamy head of fermented malt beverages such as beer, ale or the like and has for its main purpose the provision of an agent which, when added to said malt beverages in trace quantities, greatly improves the amount and persistence of the foamy head on the beverage before consumption. The term "beer" as used throughout this patent refers also to ale or any other type of malt beverage.

The foamy head on a cool glass of beer or ale is a time honored characteristic that distinguishes beer from all other drinks. It not only provides a gracious sight for the eyes when seeing the fine mesh of white bubbles floating atop the sparkling amber fluid but also is a strictly utilitarian device that improves the flavor and palatability of the beverage. In the formation of the foam when the beverage is poured, aromatic constituents and hop flavoring materials are adsorbed on the fine bubble interfaces and are carried up and concentrated in the foam where they are more readily inhaled to stimulate the olfactory nerve endings. A beer with a foam on it is a much more flavorful and palatable drink than one where the foam has dissipated. The persistence of the foam is thus of importance to the consumer to prolong the taste enjoyment of the beverage.

The production and formation of a foam on pouring is the result of a very complicated system of physico-chemical reactions. The interplay of factors in this complex system is far from being completely understood.

A beer prepared from a good malt and processed under ideal conditions should produce a good foam. However, there are many factors in the malting, brewing and processing which may deleteriously affect the foam. Some of these factors are beyond the brewer's control, such as natural variations in the lots of barley from which the malt is prepared, variations in the condition of malting process and the use of new varieties of barley by the maltsters in their constant striving to improve the quality of their malt. There are many factors that make up a high quality malt and foam potentiality is only one. It is possible to have a high quality malt in respect to its many-fold characteristics and yet, it may only be mediocre as regards to foam potentiality. During the brewing, fermentation and the lagering of the beer, there are many points where the foaminess of the final beverage may be adversely affected.

Suffice it to say that a great many brewmasters are more than pleased with the many characteristics of their beers, such as flavor, palatefulness, clarity, chillproofness, shelf-life stability and yet feel that the foam can be improved on the beers prepared from present day malt.

In accordance with the present invention, it has been found that the addition of zinc ions to beer containing gum-like materials improves the foam characteristics of such beer.

One characteristic of the beer foam that is greatly desired is the ability of the foam to deposit a lacy network pattern on the sides of the glass as the beer is consumed. The addition of the traces of zinc appears to make the drying beer foam more attractive to the glass surfaces so that a more extensive pattern and a denser laciness on the glass is obtained. The foam from the zinc treated beers appears to "wet" the glass better and adhere more firmly to the vitreous surface.

The addition of certain metals like iron, cobalt, nickel, tin, uranium and titanium to beer even in minute trace quantities, disturbs the existing delicate physico-chemical equilibrium and makes the beer become "wild." Wildness is a phenomenon where the beer gushes out of the bottle or can when it is opened and sprays the beer all over. Surprisingly the addition of the zinc ions, even in amounts beyond the minimum necessary to improve foam, does not induce this effect. Zinc ions are apparently unable to form the "wild beer nuclei" that are postulated to be responsible for this phenomenon.

Beer normally is practically free of zinc, usually containing less than 1 p.p.m. Zinc is a nutritionally important metal being one of the essential metals required by the body for optimum nutrition. Like other essential trace metals, a certain level should be ingested daily for maintaining good health and nutrition. The use of traces of zinc in beer to improve the foaminess thereby makes the beer a more complete foodstuff and prevents abnormal states which may result from a zinc deficient diet.

The trace levels of zinc ions that I have found very suitable for beer are in the range of about 5 to 25 parts per million. The upper range may, if desired, be extended beyond the optimum range to amounts of 100 or even to 500 parts per million. There is not much point in employing these extremely high levels as the foam improvement is not directly proportional to the zinc ion concentration at these high levels of treatment.

At the present time there are available certain gummy types of materials such as gum arabic, propylene glycol alginate, carboxy methyl cellulose or carboxy methyl hydroxyethyl cellulose which are used by brewers, with more or less success, to improve the foam of the beer. The materials are generally added to the fermented beer in storage at levels of about 2 to 5 pounds per 100 barrels. This is equivalent to approximately 80 to 200 parts per million. It has been found that zinc ions and the gummy type of foam stabilizers are complementary in their foam stabilizing effect and the combined use of these materials permits the realization of foam improvements hitherto impossible of achievement.

The mixture of zinc and gummy material may be added at any point in the brewing process. I prefer to add the treatment to the fermented beer at the beginning of the cold storage period. It may be added to the beer before or after prefiltration early in storage or it can also be added late in storage before or after the final filtration, immediately before packaging.

The following examples are given to illustrate the practice of the invention and are not to be construed as limiting the scope of this invention thereto. Many variations and changes are possible without departing from the coverage of the appended claim.

*Example.*—A dry mixture of 26 parts of propylene glycol alginate and 14 parts of zinc sulfate ($ZnSO_4 \cdot H_2O$) is prepared. A 1% solution of this mixture is made and added to beer at the rate of 1 pound of dry mixture per 100 barrels. This gives a treatment level of 5 parts per million of zinc and about ⅔ pound of propylene glycol alginate per 100 barrels. The beer after being processed in the regular manner without further change possessed superior foaming properties as compared to beer which had been similarly prepared but did not contain added zinc ions. It also possessed superior foam properties when compared to beer containing propylene glycol alginate but no added zinc ions.

Many variations may be made in the above example; for instance, any soluble zinc salt such as zinc acetate, zinc nitrate or zinc lactate, may be substituted for the zinc sulfate or zinc chloride. Such salts should of course be non-toxic in the amount used. The proportions of the gummy materials to zinc may be varied over a wide range. For instance, the zinc salt can be as low as 1% of the mixture or up to 70% of the mixture. The amount of these different mixtures may be used from 0.5 to 10 pounds per 100 barrels of beer.

In the above example, the resulting beer produced with the added zinc ions produced a much more generous head of foam on pouring, a head which is longer lasting, more persistent and flavorful and leaves a greater pattern of foamy laciness on the walls of the glass than do similar beers prepared without the added zinc ions.

The embodiments of the present invention in which an exclusive property or privilege is claimed are as follows:

A composition of matter for improving the foam of fermented malt beverages comprising a mixture of propylene glycol alginate and a water-soluble zinc salt, the zinc salt comprising 1 to 70% of the mixture.

References Cited by the Examiner

UNITED STATES PATENTS

| | | | |
|---|---|---|---|
| 2,559,612 | 7/1951 | Geller | 99—48 |
| 2,712,500 | 7/1955 | Weaver et al. | 99—48 |
| 2,838,399 | 6/1958 | Vogel | 99—48 |

OTHER REFERENCES

Blom: Wochenschrift fur Brauerei, Jan. 25, 1936, pp. 25 to 29, p. 27 relied on.

Blom: Journal of Institute of Brewing, 1937, vol. 43, pp. 251–262, p. 258 relied on.

Condensed Chemical Dictionary, 1956, Reinhold Publ. Co., p. 37.

A. LOUIS MONACELL, *Primary Examiner.*

TOBIAS E. LEVOW, ABRAHAM H. WINKELSTEIN,
*Examiners.*